United States Patent
Chow et al.

Patent Number: 5,832,428
Date of Patent: Nov. 3, 1998

[54] SEARCH ENGINE FOR PHRASE RECOGNITION BASED ON PREFIX/BODY/SUFFIX ARCHITECTURE

[75] Inventors: Yen-Lu Chow, Saratoga, Calif.; Hsiao-Wuen Hon, Woodinville, Wash.

[73] Assignee: Apple Computer, Inc., Cupertino, Calif.

[21] Appl. No.: 538,828

[22] Filed: Oct. 4, 1995

[51] Int. Cl.$^6$ .................................. G10L 5/06; G10L 9/00

[52] U.S. Cl. ............................................ 704/254; 704/255

[58] Field of Search .............................. 395/2, 2.63, 2.64, 395/2.65, 2.66, 2.6, 759, 760, 797, 798

[56] References Cited

U.S. PATENT DOCUMENTS

| | | | |
|---|---|---|---|
| 5,027,406 | 6/1991 | Roberts et al. | 381/43 |
| 5,220,639 | 6/1993 | Lee | 395/2 |
| 5,267,345 | 11/1993 | Brown et al. | 395/2.64 |
| 5,384,892 | 1/1995 | Strong | 395/2.52 |
| 5,386,494 | 1/1995 | White | 395/2.84 |
| 5,390,279 | 2/1995 | Strong | 395/2 |
| 5,502,790 | 3/1996 | Yi | 395/2.65 |
| 5,613,036 | 3/1997 | Strong | 395/2.52 |

OTHER PUBLICATIONS

Lowerre, B., "The Harpy Speech Recognition System", Cargenie Mellon University, Apr. 1976, pp. 54–72.

*Primary Examiner*—David R. Hudspeth
*Assistant Examiner*—Patrick N. Edouard
*Attorney, Agent, or Firm*—Blakely, Sokoloff, Taylor & Zafman

[57] ABSTRACT

A method of constructing a language model for a phrase-based search in a speech recognition system and an apparatus for constructing and/or searching through the language model. The method includes the step of separating a plurality of phrases into a plurality of words in a prefix word, body word, and suffix word structure. Each of the phrases has a body word and optionally a prefix word and a suffix word. The words are grouped into a plurality of prefix word classes, a plurality of body word classes, and a plurality of suffix word classes in accordance with a set of predetermined linguistic rules. Each of the respective prefix, body, and suffix word classes includes a number of prefix words of same category, a number of body words of same category, and a number of suffix words of same category, respectively. The prefix, body, and suffix word classes are then interconnected together according to the predetermined linguistic rules. A method of organizing a phrase search based on the above-described prefix/body/suffix language model is also described. The words in each of the prefix, body, and suffix classes are organized into a lexical tree structure. A phrase start lexical tree structure is then created for the words of all the prefix classes and the body classes having a word which can start one of the plurality of phrases while still maintaining connections of these prefix and body classes within the language model.

32 Claims, 15 Drawing Sheets

304

| WORD | PHONETIC SYMBOL |
|---|---|
| ... | ... |
| 美国<br>美华<br>美丽 | mei guo<br>mei hua<br>mei li |
| ... | ... |
| 中国<br>中和<br>中间 | zhong guo<br>zhong he<br>zhong jian |
| ... | ... |

*Figure 4*

LEXICAL TREE FOR BODY CLASS i

SEARCH ENGINE FOR PHRASE RECOGNITION BASED ON PREFIX/BODY/SUFFIX ARCHITECTURE

FIELD OF THE INVENTION

The present invention pertains to the field of speech recognition systems. More particularly, this invention relates to an improved search engine for phrase recognition based on prefix/body/suffix architecture in a speech recognition system.

BACKGROUND OF THE INVENTION

Speech dictation is arguably the most efficient way to enter large amounts of text into a computer system. This is especially true for the Chinese language. For example, a dictation system that recognizes the Chinese language significantly reduces the overhead associated with inputting the Chinese language into a computer system. Because the Chinese language is not an alphabet-based system, inputting a Chinese character is difficult and time-consuming. For example, a Chinese character consists of different strokes, which are not easily represented by a key on a keyboard, as in the English language. Accordingly, it is very unnatural for a user to input the Chinese language into a computer system via keyboard or mouse. Moreover, extensive training in input methods is typically required to input a non-alphabetic set of characters into a computer system.

However, although inputting Chinese characters through speech recognition has long been proposed, the technique of inputting Chinese characters based on speech still faces some difficulties that are typically hard to overcome.

One of the difficulties is the relatively large number of vocabulary for the Chinese language. As is known, the commonly used Chinese characters typically range from several thousand to several tens of thousands. In addition, there are typically several tens of thousands of commonly used Chinese words that are formed by characters. This typically causes the transformation of speech utterances into Chinese text (i.e., speech recognition search) to be unrealistically long and time consuming. As is known, the transformation from speech into a corresponding language text has to be completed in real time in order for the speech recognition system to be practically used.

Another difficulty is that a large number of homonym characters or words exist for almost every pronunciation in Chinese. That is, even through the pronunciation is correctly recognized, it is still difficult to obtain the exact characters or words. In addition, whereas the words in alphabetic language are clearly defined by blank spaces between those words, the concept of a "word" for the Chinese language is very ambiguous because there is no equivalent word separator in the Chinese language. Allowing for flexibility in the definition of the word further complicates the speech recognition search and makes it even more time consuming. As a result, it is very difficult to obtain real time speech recognition for the Chinese language.

SUMMARY OF THE INVENTION

One of the features of the present invention is to provide a search architecture for efficiently recognizing language phrases in a speech recognition system.

Another feature of the present invention is to provide a phrase-based search process that takes advantage of a prefix/body/suffix language phrase structure.

A further feature of the present invention is to create a lexical tree for all the prefix words grouped in one class, a lexical tree for all the body words grouped in one class, and a lexical tree for all the suffix words grouped in one class in a prefix/body/suffix language phrase structure.

A still further feature of the present invention is, in a prefix/body/suffix class-based language phrase model, to organize all the prefix and body word classes that can start a phrase into a single lexical tree structure while still maintaining their connections in the language model to other body and/or suffix word classes that are established by a set of linguistic rules.

A method of constructing a language model for a phrase-based search in a speech recognition system is described. An apparatus which constructs, stores and searches through the language model is also described. The method includes, in one embodiment, the step of separating a plurality of phrases into a plurality of words in a prefix word, body word, and suffix word structure. Each of the phrases has a body word and optionally a prefix word and optionally a suffix word. The words are grouped into a plurality of prefix word classes, a plurality of body word classes, and a plurality of suffix word classes in accordance with a set of predetermined linguistic rules. Each of the respective prefix, body, and suffix word classes includes a number of prefix words of a particular category, a number of body words of a particular category, and a number of suffix words of a particular category, respectively. The prefix, body, and suffix word classes are then interconnected together according to the predetermined linguistic rules.

A method of organizing a phrase search in a speech recognition system having the above-described prefix/body/suffix language model is also described. An apparatus which organizes and/or performs a phrase search through a language model of the present invention is also described. The method includes, in one embodiment, the step of organizing the words in each of the prefix, body, and suffix classes into a lexical tree structure. A phrase start lexical tree structure is then created for the prefix classes and the body classes which can start one of the plurality of phrases while still maintaining connections of these prefix and body classes within the language model such that a phrase can be efficiently found.

BRIEF DESCRIPTION OF THE DRAWINGS

The present invention is illustrated by way of example and not limitation in the figures of the accompanying drawings, in which like references indicate similar elements and in which:

FIG. 4 illustrates the word-phonetic symbol look-up table of the dictionary database of FIG. 3;

DETAILED DESCRIPTION

Figure 1:
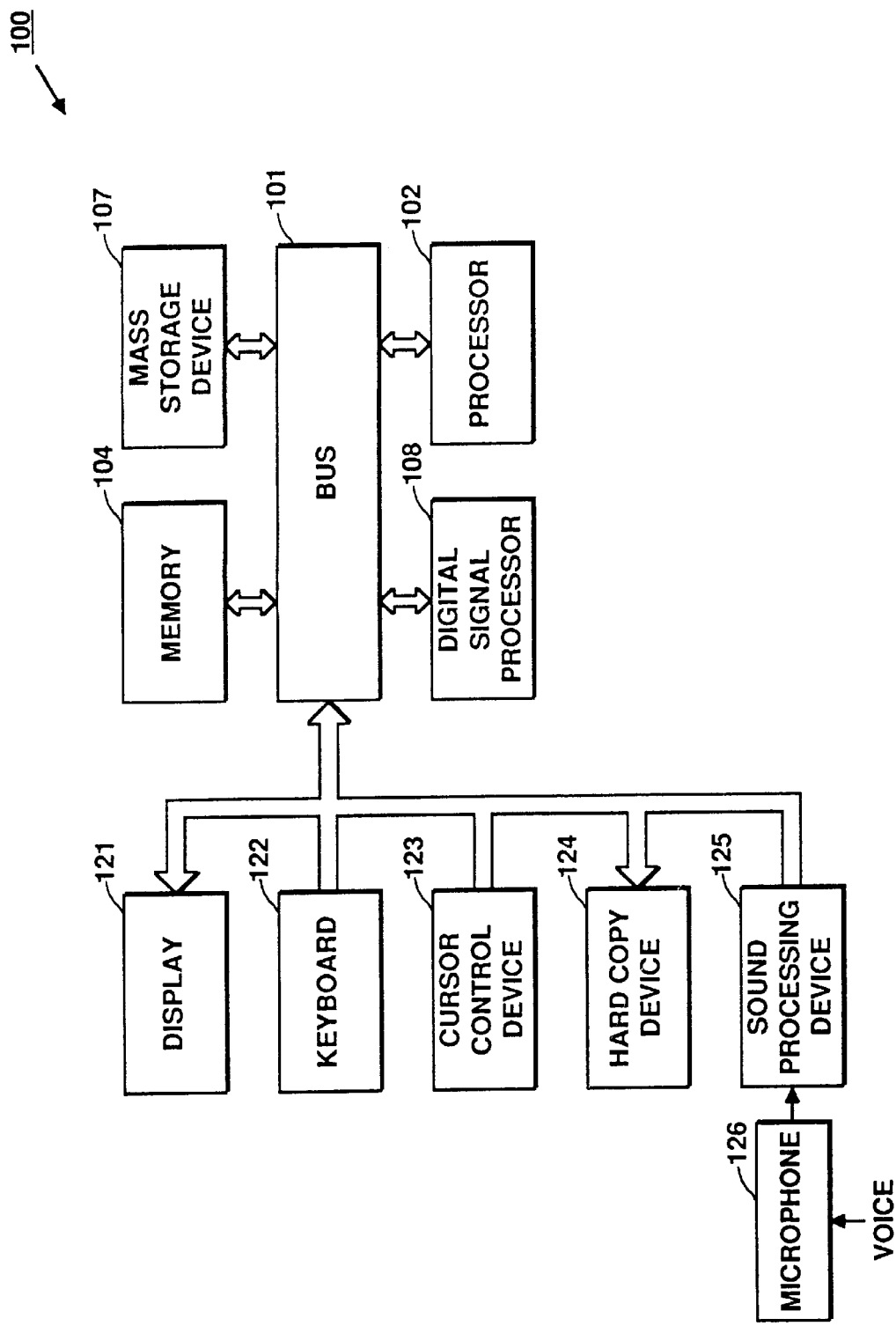
FIG. 1 shows a computer system that includes a speech recognition system.

FIG. 1 illustrates a computer system 100 that implements the speech recognition system on which one embodiment of the present invention is implemented. Although FIG. 1 shows some of the basic components of computer system 100, it is neither meant to be limiting nor to exclude other components or combinations of components.

Referring to FIG. 1, computer system 100 includes a bus 101 for transferring data and other information. Computer system 100 also includes a processor 102 coupled to bus 101 for processing data and information. Computer system 100 also includes a memory 104 and a mass storage device 107 coupled to bus 101.

Computer system 100 also includes a digital signal processor 108 which performs digital signal processing functions and offers additional processing bandwidth. Alternatively, computer system 100 does not include digital signal processor 108, and the digital signal processing functions of computer system 100 are accomplished by executing the digital signal processing software on processor 102.

Computer system 100 may further include a display device 121 coupled to bus 101 for displaying information to a computer user. Keyboard input device 122 is also coupled to bus 101 for communicating information and command selections to processor 102. An additional user input device is a cursor control device 123, such as a mouse, a trackball, a trackpad, or cursor direction keys, coupled to bus 101 for communicating direction information and command selections to processor 102, and for controlling cursor movement on display 121. Cursor control device 123 typically includes a signal generation device which provides signals that indicate command selections to processor 102. Another device which may be coupled to bus 101 is a hard copy device 124 which may be used for printing instructions, data, or other information on a medium such as paper, film, or similar types of media.

System 100 may further include a sound processing device 125 for digitizing sound signals and transmitting such digitized signals to processor 102 or digital signal processor 108 via bus 101. In this manner, sound may be digitized and then recognized using processor 108 or 102. Sound processing device 125 is coupled to an audio transducer such as microphone 126. Sound processing device 125 typically includes an analog-to-digital (A/D) converter and can be implemented by known sound processing circuit. In addition, microphone 126 can be implemented by any known microphone or sound receiver.

In one embodiment, system 100 is one of the Macintosh® brand family of personal computers available from Apple Computer, Inc. of Cupertino, Calif. Processor 102 is one of the Motorola 680x0 family of processor available from Motorola, Inc. of Schaumburg, Ill., such as the 68020, 68030, or 68040. Alternatively, processor 102 may be a PowerPC processor also sold by Motorola Inc. Processor 108, in one embodiment, comprises one of the AT&T DSP 3210 series of digital signal processors available from American Telephone and Telegraph (AT&T) Microelectronics of Allen Town, PA.

Figure 2:
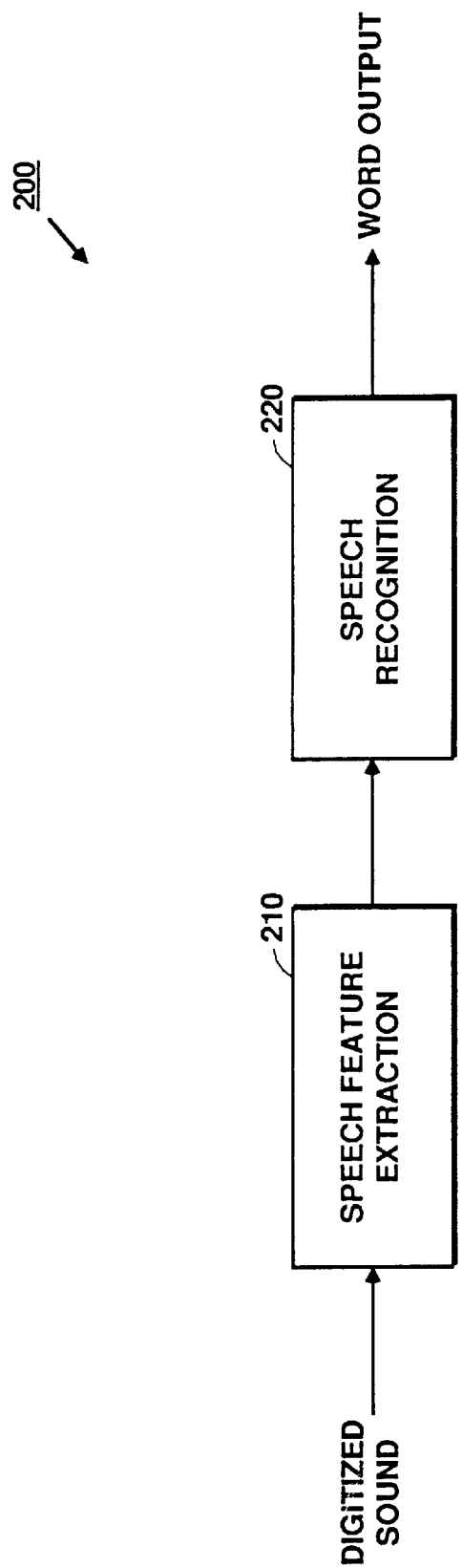
FIG. 2 is a block diagram of the speech recognition system of FIG. 1, wherein the speech recognition system includes a speech recognition function.

Computer system 100 includes a speech recognition system 200 (shown in FIG. 2). Many types of speech recognition systems are known in the art; see, for example, the system described in U.S. Pat. No. 5,384,892 the contents of which are incorporated by reference herein. For one embodiment, speech recognition system 200 is implemented as a series of software routines that are run by processor 102, which interacts with data received from digital signal processor 108 via sound processing device 125. It will, however, be appreciated that speech recognition system 200 can also be implemented in discrete hardware or firmware, or in a combination of software and/or hardware. FIG. 2 shows speech recognition system 200 in functional block diagram form, which will be described in more detail below.

In one embodiment, speech recognition system 200 is a Chinese language speech recognition system. Alternatively, speech recognition system 200 can be any other kind of pictographic language speech recognition system. For example, speech recognition system 200 can be a Japanese or Korean language speech recognition system. In addition, speech recognition system 200 can be a non-pictographic language speech recognition system, such as a computer system which recognizes English language speech.

Referring to FIG. 2, a digitized sound signal is fed from sound processing device 125 (shown in FIG. 1) to a speech feature extraction process 210 which is otherwise known as the "front end" of speech recognition system 200. Speech feature extraction process 210 is performed, in one embodiment, by digital signal processor 108. This feature extraction processor 210 recognizes acoustic features of human speech, as distinguished from other sound signal information contained in the digitized sound signal. In this manner, features such as phones or other discrete spoken speech units may be extracted, and analyzed to determine whether words are being spoken. Spurious noises such as background noises and user noises other than speech are ignored. Speech feature extraction process 210 can be implemented by any known technique and means.

The acoustic features from speech feature extraction process 210 are input to a recognizer process 220 which performs speech recognition using a language model to determine whether the extracted features represent expected words in a vocabulary recognizable by the speech recognition system. In one embodiment, recognizer process 220 uses a recognition algorithm to compare a sequence of frames produced by an utterance with a sequence of nodes contained in the acoustic model of each word under the guidance of the language model to determine if a match exists. The result of the recognition matching process is a text output which is then shown on the display. In one embodiment of the present invention, the speech recognition algorithm employed is the Hidden Markov Model (HMM). Details of recognizer process 220 are shown in FIG. 3, which will also be described in more detail below.

Figure 3:
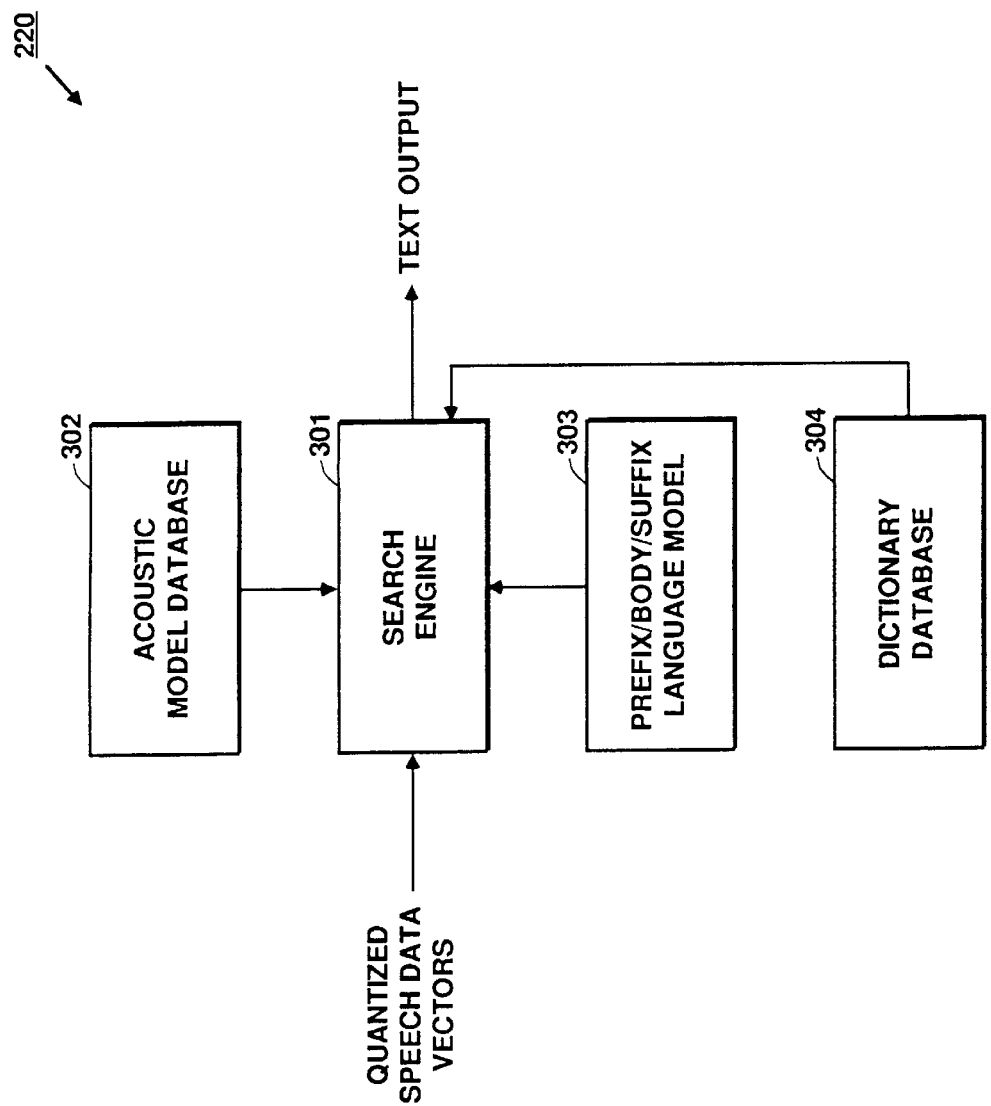
FIG. 3 shows in block diagram form the speech recognition function of FIG. 2 that includes a prefix/body/suffix language model structured in accordance with one embodiment of the present invention.

Referring to FIG. 3, recognizer 220 includes search engine 301. In one embodiment, search engine 301 is implemented by software running on processor 102 of FIG.

1. Search engine 301 implements the recognition algorithm of recognizer process 220. Except for the process described in more detail below for guiding the acoustic matching process through a prefix/body/suffix structured language model, search engine 301 is implemented in accordance with known technique and means. Search engine 301 receives quantized speech data vectors from speech feature extraction process 210 (FIG. 2); from these vectors, search engine 301 outputs text as a result of its search in accordance with the speech data vectors received.

Search engine 301 is connected to an acoustic model database 302 which can be constructed in any known manner and by any known means. Acoustic model database 302 includes acoustic models of all of the words that can be recognized by recognizer 200. These words are stored in a dictionary database 304 of recognizer 200. Dictionary database 304 can also be constructed in any known manner and by any known means.

The recognition algorithm of search engine 301 uses probabilistic matching and dynamic programming for the acoustic matching process. Probabilistic matching determines the likelihood that a given frame of an utterance corresponds to a given node in an acoustic model of a word. This likelihood is determined not only as a function of how closely the amplitude of the individual frequency bands of a frame match the expected frequencies contained in the given node models, but also as a function of how the deviation between the actual and expected amplitudes in each such frequency band compares to the expected deviations for such values.

Dynamic programming, or viterbi searching, provides a method to find an optimal, or near optimal, match between the sequence of frames produced by the utterance and the sequence of nodes contained in the model of the word. This is accomplished by expanding and contracting the duration of each node in the acoustic model of a word to compensate for the natural variations in the duration of speech sounds which occur in different utterances of the same word. A score is computed for each time aligned match, based on the sum of the dissimilarity between the acoustic information in each frame and the acoustic model of the node against which it is time aligned. The words with the lowest sum of such distances are then selected as the best scoring words. The score combined of the probability matching and dynamic programming is referred to as acoustic matching score.

Dictionary database 304 is connected to search engine 301 and stores the phonetic symbol of each of the words which is in the recognizable vocabulary of the recognizer 200. In other words, dictionary database 304 is a pronunciation dictionary database. FIG. 4 illustrates examples of the words stored and their corresponding phonetic symbol in a lookup table.

Referring to FIG. 4, as can be seen from the table, each Chinese word has a corresponding phonetic symbol. In one embodiment, the phonetic symbol for each of the Chinese words also includes a tone symbol which is not shown in FIG. 4. As is known, there are typically four tones for each phonetic symbol representing the sound of a Chinese character. The table shown in FIG. 4 is arranged according to the alphabetic order of the phonetic symbols. As can be seen from FIG. 4, a standard Chinese phonetic system (i.e., Pin-Yin) is used to generate the phonetic symbol for each word. The Pin-Yin phonetic system is a well known phonetic standard to the Chinese people living in mainland China. Therefore, it is not necessary to describe this phonetic system hereinafter. Alternatively, other Chinese phonetic systems can be used to produce the phonetic symbols.

It is to be noted that the lookup table shown in FIG. 4 for database 304 only shows, for illustrative purposes, a limited number of words with their phonetic symbols. In practice, the lookup table contains all the words stored in database 304 (FIG. 3) and their phonetic symbols. Moreover, the lookup table in FIG. 4 only shows one word for each phonetic symbol. In reality, some of the phonetic symbols each may have homonym words. In this case, each word can be identified by including an identifying symbol (e.g., an order symbol) for each phonetic symbol that has homonym words. FIG. 4 does not show the homonym words and the identifying symbols in order not to unnecessarily obscure the description of the present invention. It will be appreciated that, in one embodiment, a representation of the database 304 is stored on the mass storage device 107 and may, in addition, be stored, at least in part, in memory 104.

Figure 5A:
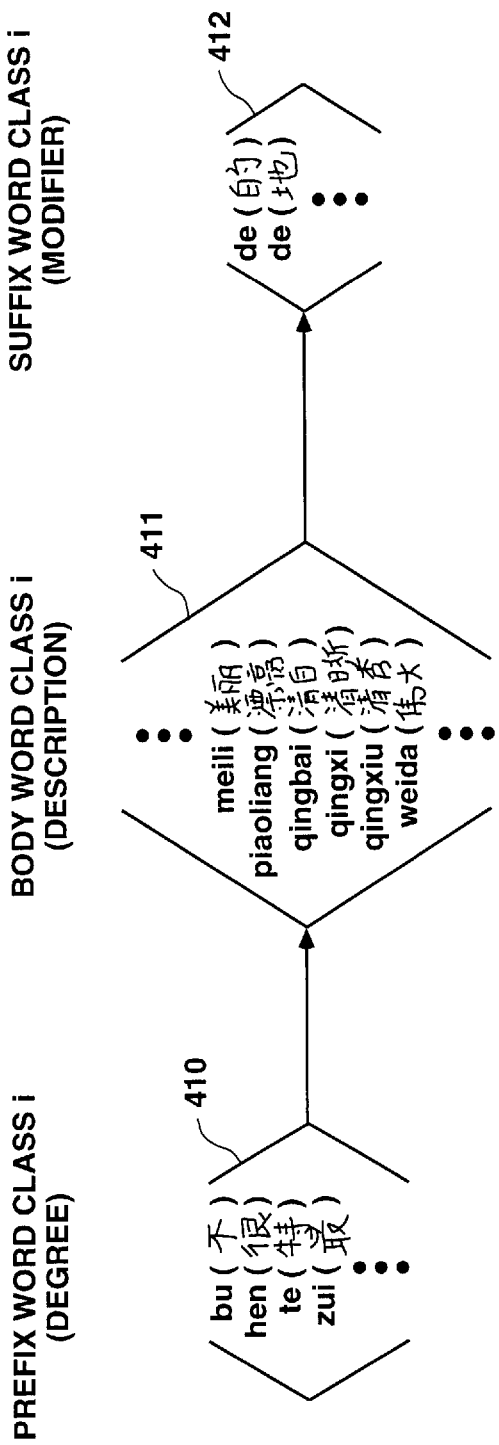
FIGS. 5A and 5B show two examples of arranging Chinese phrases in a prefix/body/suffix word class structure for the prefix/body/suffix language model of FIG. 3 in accordance with one embodiment of the present invention.
Figure 5B:
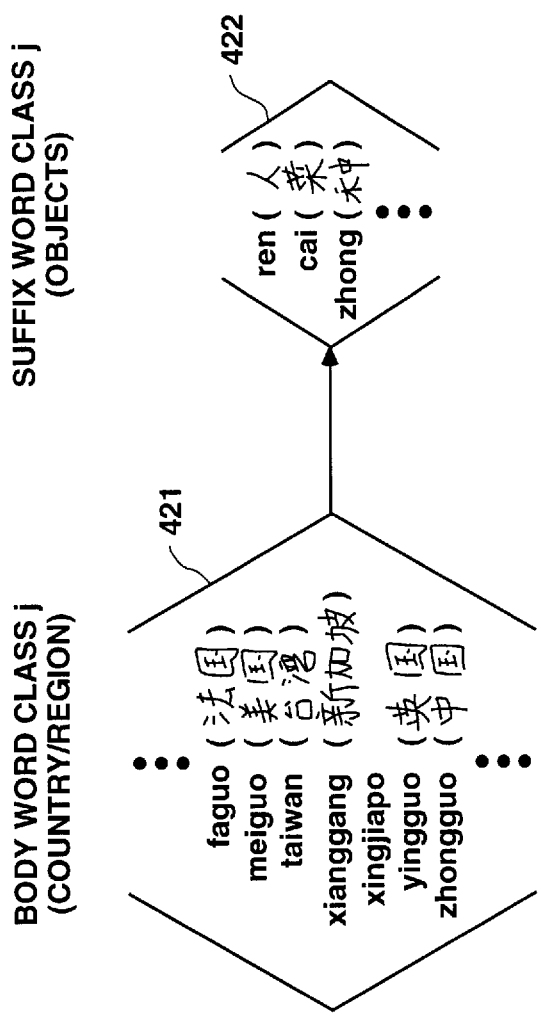
Figure 5C:
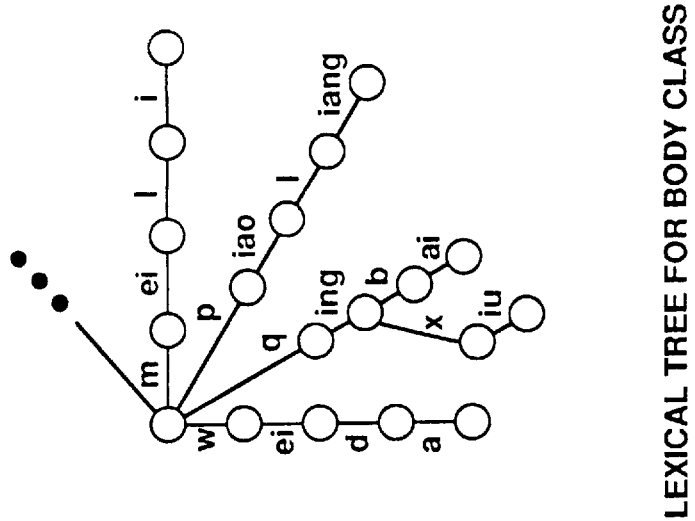
FIG. 5C shows the lexical tree organization of the body word class i of FIG. 5A.

Referring back to FIG. 3, recognizer 220 also includes a prefix/body/suffix language model 303. Language model 303 is connected to search engine 301. The function of language model 303 is to guide or govern search engine 301 to perform the acoustic matching process for the speech data vectors received. As described above, language model 303 is constructed in a prefix/body/suffix structure according to one embodiment of the present invention. This prefix/body/suffix structure is specially suited for searching Chinese phrases. As a result, search engine 301 includes the process for guiding the acoustic matching process through the prefix/body/suffix structured language model in accordance with one embodiment of the present invention. The prefix/body/suffix structure of language model 303 and its construction are shown in FIGS. 5A through 5G, which will be described in more detail below. In addition, FIGS. 6A and 6B show the process of constructing the prefix/body/suffix structure for language model 303, which will also be descried in more detail below. A process of search engine 301 that uses the prefix/body/suffix structure of language model 303 is also shown in FIG. 6C, which will also be described in more detail below. It will be appreciated that the data structure, which represents the prefix/body/suffix language model, will typically be stored at some point in time on the mass storage device 107 and may, in one embodiment, also be stored, at least in part, in memory 104.

Figure 5D:
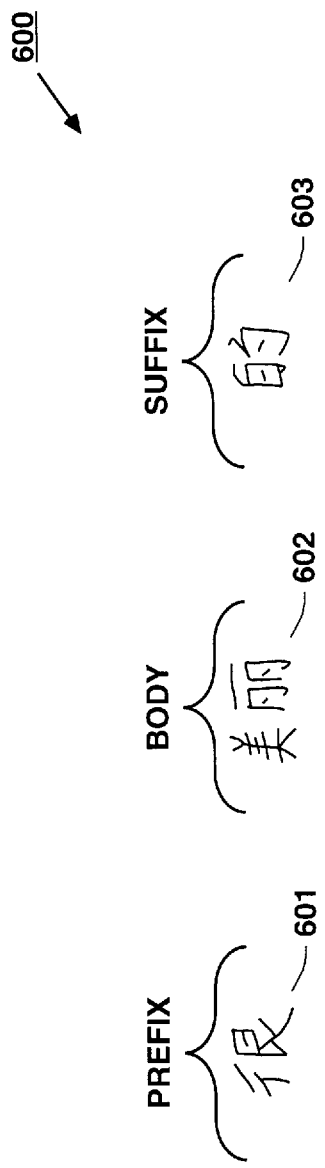
FIGS. 5D and 5E show two examples of arranging Chinese phrases in the prefix/body/suffix structure.
Figure 5E:
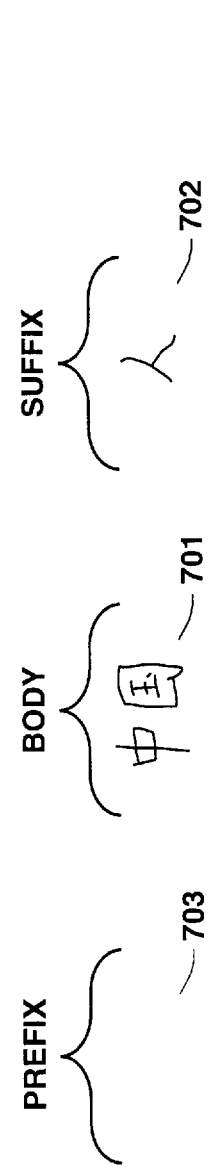
Figure 6A:
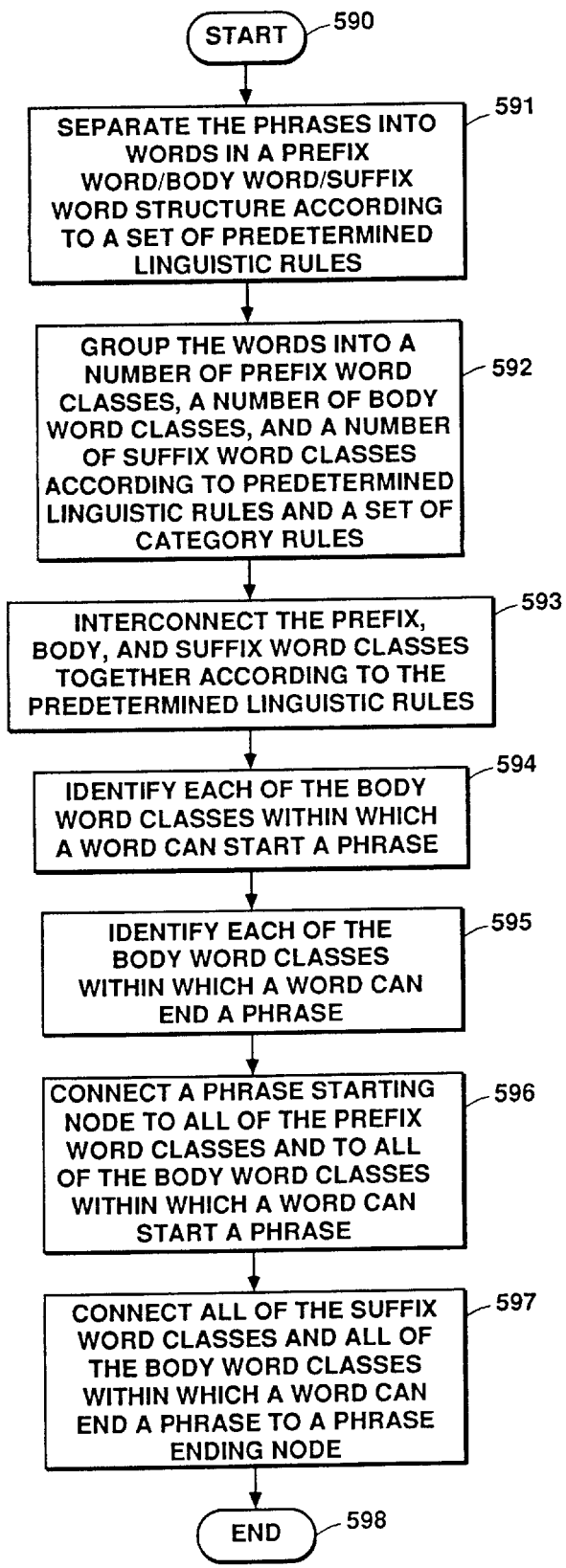
FIGS. 6A through 6C show in flow chart diagram form the process of organizing the language model of FIG. 3 and the process of organizing a phrase search in the search engine of FIG. 3 using the language model of FIG. 3 in accordance with one embodiment of the present invention.
Figure 6B:
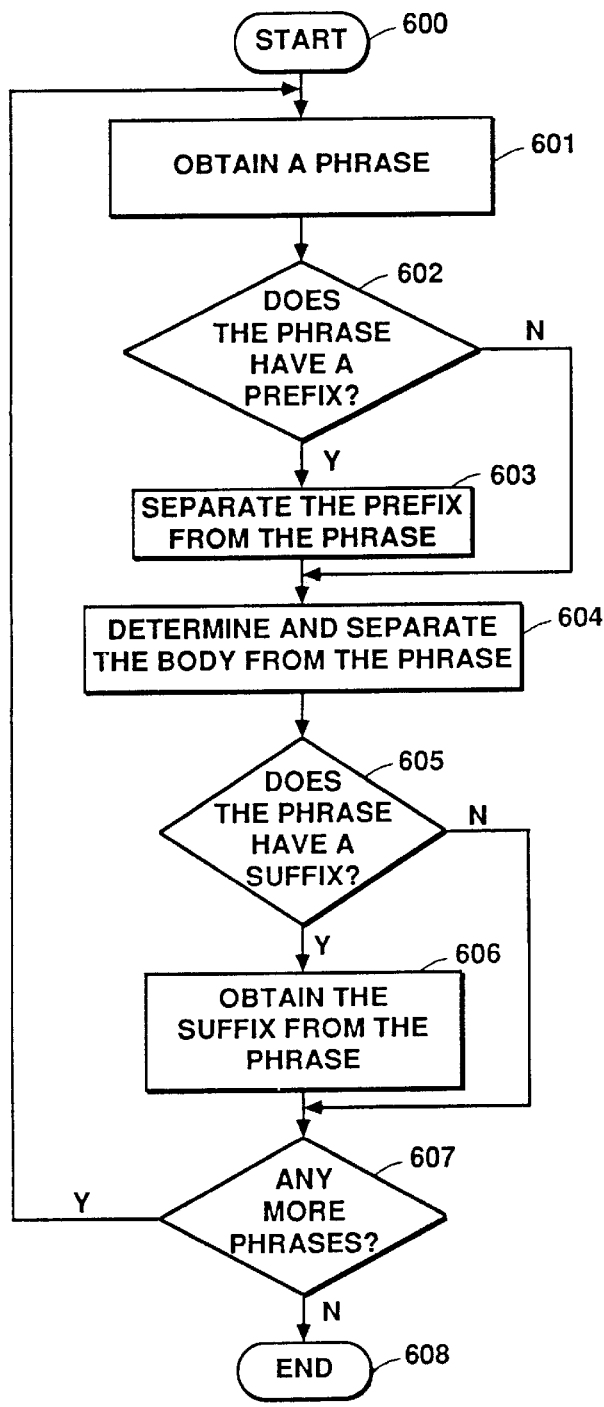
Figure 6C:
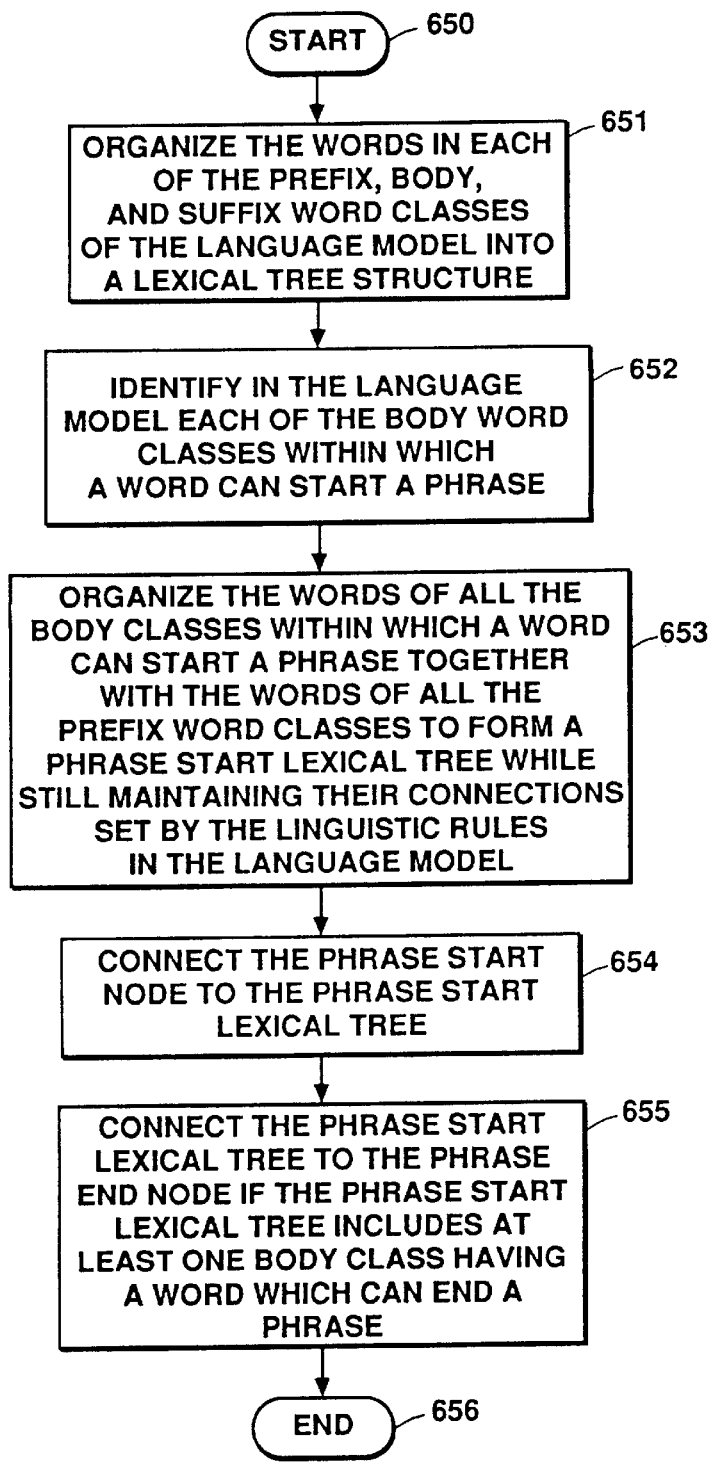

Referring first to FIGS. 5D and 5E, two Chinese phrases are shown to illustrate the process of organizing a Chinese phrase in the prefix/body/suffix structure. As can be seen from FIG. 5D, the phrase 600 has a prefix word 601, a body word 602, and a suffix word 603. Prefix word 601 incudes one Chinese character and suffix word 603 also includes one Chinese character. Body word 602 includes one or more Chinese characters. As a rule according to one embodiment, for organizing the prefix/body/suffix structure, each of the prefix and suffix words of a phrase can only have one character while the body word of a phrase can be one or more characters. The organization of a phrase in the prefix/body/suffix structure is done in accordance with a set of well known Chinese linguistic rules. That is, it is done in accordance with known, accepted linguistic rules of the Chinese language. FIG. 5E shows the prefix/body/suffix structure of another Chinese phrase 700. As can be seen from FIG. 5E, phrase 700 has a body word 701 and a suffix word 702. Phrase 700 does not have a prefix word (i.e., the prefix word field 703 for phrase 700 is empty). It thus can be concluded that a Chinese phrase has at least a body word and optionally a prefix word and/or an optional suffix word. This means that a phrase may not have a prefix word or a suffix word. In addition, a phrase may not have a prefix word and a suffix word.

FIG. 6B shows the process of arranging a phrase in the prefix/body/suffix structure, which will be described in more detail below.

As can be seen from FIG. 6B, the process starts at step 600. At step 601, a phrase which is to be recognized by the speech recognition system is selected. At step 602, it is determined if the phrase has a prefix word. The determination is made in accordance with conventional Chinese linguistic rules. If the phrase is determined to have a prefix word, then the process goes to step 603. If the phrase does not have the prefix word, then the process skips step 603. At step 603, the prefix word is separated or identified from the phrase. Then step 604 is performed at which the body word of the phrase is determined and separated from the phrase. Again, the determination is based on the known Chinese linguistic rules. Then step 605 is performed to determine if the phrase has a suffix word. If so, step 606 is performed to obtain the suffix word. If not, step 606 is bypassed. Then step 607 is performed to determine if there are more phrases. If so, the process returns to step 601. If not, the process ends at step 608. All of the steps of the process shown in FIG. 6B can be implemented by any known means. It will be appreciated that numerous data structures may be created to implement this separation of phrases; for example, a data structure may have, for a given phrase, an identifier and/or delimiter for each of the prefix, body and suffix of the given phrase. In this manner, the phrase may be arranged in accordance with the prefix/body/suffix structure, architecture of the present invention. This data structure of the separated phrases may be stored at some point in time, in one embodiment of the invention, on mass storage device 107, and may also be stored, at least in part, in memory 104.

When a number of Chinese phrases are arranged in accordance with the prefix/body/suffix structure, there are a number of prefix words, a number of body words, and a number of suffix words. These prefix words, body words, and suffix words are then arranged into a number of prefix word classes, a number of body word classes, and a number of suffix word classes in accordance with categories set by the known Chinese language rules. This arrangement or grouping may be implemented by any of the numerous procedures in computer science which allow association of data elements; thus, in one embodiment each word may be given a class identifier or plurality of class identifiers which specify a particular class. For example, a country/region body word class can be created to include a number of body words of countries and/or regions. As a further example, a description body word class can be created to include a number of description body words. Each prefix word class includes a number of prefix words of the particular category. Each body word class includes a number of body words of the particular category. Likewise, each of the suffix word class includes a number of suffix words of the particular category.

FIGS. 5A and 5B show examples of prefix, body, suffix word classes, which will be described in more detail.

As can be seen from FIG. 5A, the prefix word class i is a degree class that includes a number of degree prefix words 410 shown along with their phonetic symbols. This is due to the fact that language model 303 of FIG. 3 is structured by the phonetic symbols of the words. For example, as can be seen from FIG. 5A, the degree prefix words 410 include the Chinese words meaning "not", "very", "the most", etc. Thus, the degree prefix words 410 are in a degree prefix class and are in the same category of "degree". The body word class i is a description word class that includes a number of descriptive body words 411 (e.g., the Chinese words for "handsome", "beauty", "clear", etc.). The suffix word class i is a modifier suffix word class that includes a number of modifier suffix words 412 (e.g. "de" as shown in FIG. 5A). As is shown in FIG. 5B, the body word class j is a country/region body word class that includes a number of country/region body words 421 (e.g., the Chinese words for France, U.S.A., Taiwan, China, etc.). The suffix word class j is an suffix word class for objects that includes a number of object suffix words 422 (e.g., the Chinese words for "people" and "food", etc.).

Figure 5F:
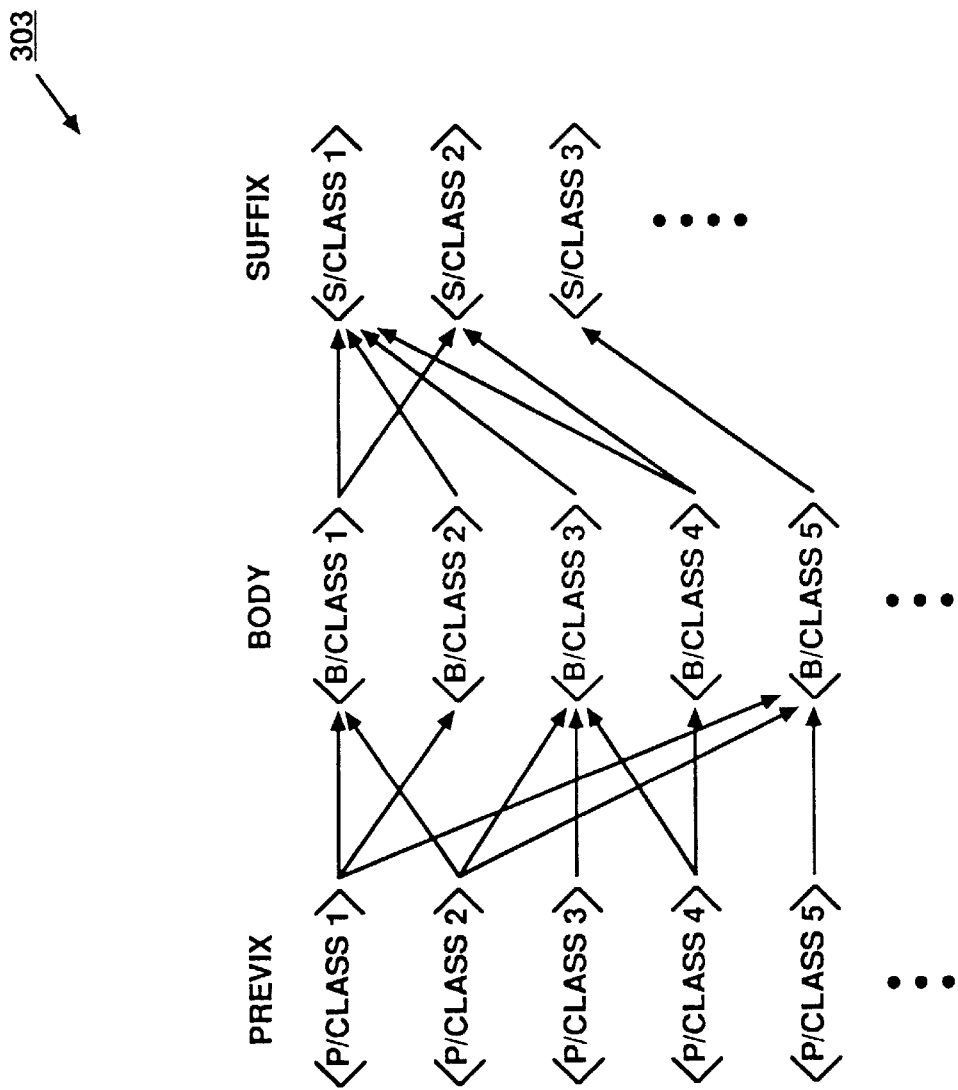
FIGS. 5F and 5G show the organization, in different ways, of the prefix/body/suffix language model of FIG. 3.

The prefix, body, and suffix word classes are then connected or associated to represent the phrases. The connections or associations are established in accordance with the following rules and may be implemented using conventional programming techniques which provide associations or connections. Prefix word class i is connected to body word class j if each of the prefix words in prefix word class i can be connected to any of the body words of the body word class j. Body word class j is connected to suffix word class k if each of the body words of body word class k can be connected to any of the suffix words of the suffix word class k. In addition, both prefix word class i and suffix word class k can be optional for body word class j. This means that each word in body word class j can be the start and/or end of a phrase. FIGS. 5A and 5B show some examples of the connections in accordance with such rules. Moreover, FIG. 5F shows an example of the connections among the word classes for phrases structured in the prefix/body/suffix structure for language model 303 of FIG. 3. These connections or associations may be implemented by numerous known procedures in computer science, including, for example, pointers.

As is known, each prefix word in a prefix word class always starts a phrase and a suffix word in a suffix word class always ends a phrase. However, as described above, some phrases may not have any prefix word and/or suffix word. This causes the body words in some body word classes to be directly connected to a phrase starting node (see, e.g., body class 512 in FIG. 5G) or to a phrase ending node (e.g. body class 514 in FIGS. 5G) which are connected to all the prefix and suffix word classes (see FIG. 5G). Thus, each of the body word classes is also specified as a phrase starting body word class and/or phrase ending body word class if each of the body words in that body word class can start and/or end a phrase. For example, because each of the body word class i in FIG. 5A can start a phrase, the body word class i is also specified as a phrase start body word class. When this occurs, the body word class i is not only connected to the prefix word class i, but to a phrase starting node as well.

Figure 5G:
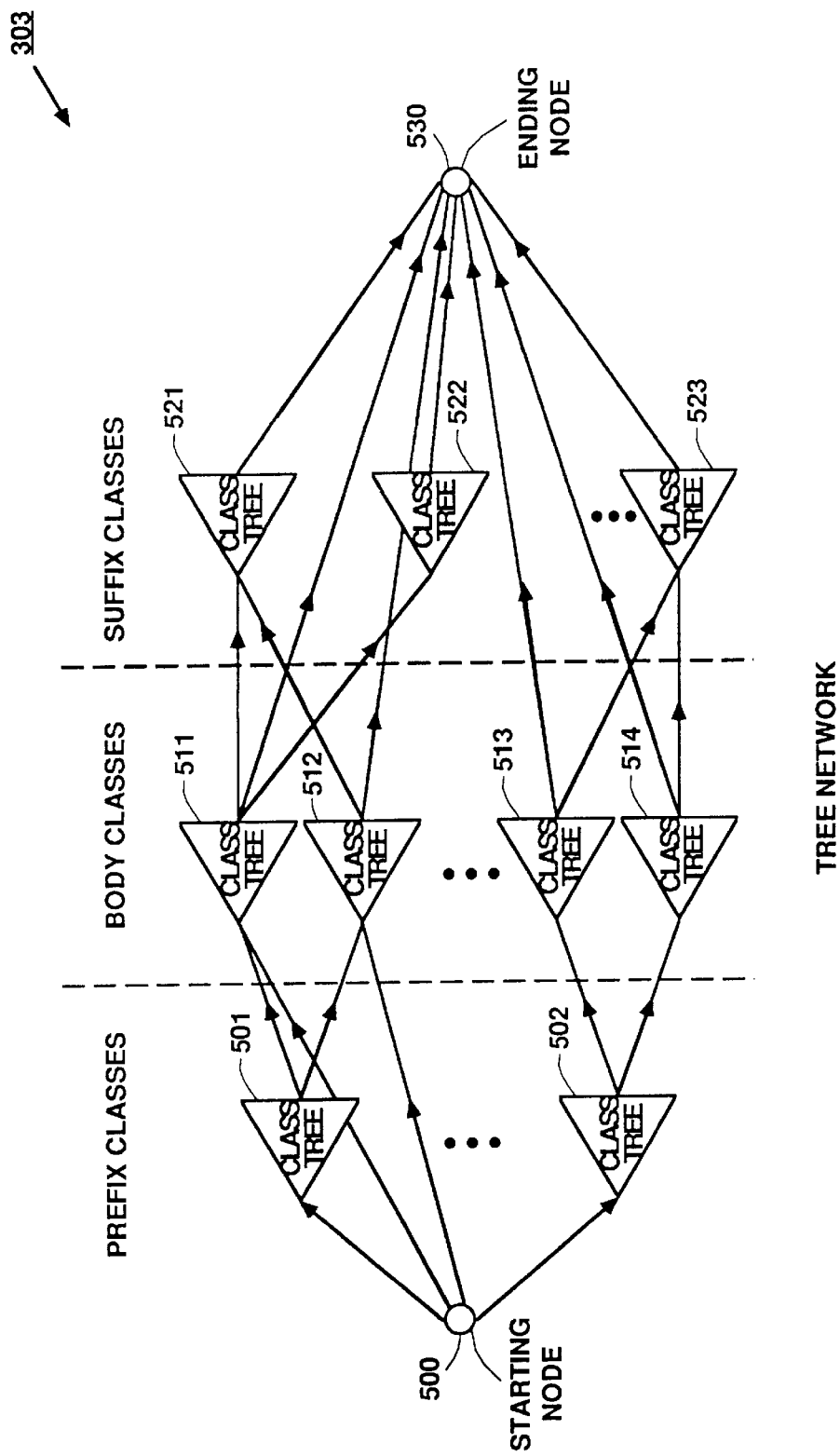

Then the words within each of the prefix, body, and suffix word classes are arranged into a single lexical tree. This is done in order to reduce the memory requirement (e.g. the use of memory 104 or mass storage device 107) to store those words and to allow efficient search through the words in each word class. The organization of each of the word classes can be done by any known means or manner. FIG. 5C shows the lexical tree for body class i of FIG. 5A. FIG. 5G shows the lexical tree structured according to the prefix/body/suffix language model 303.

As can be seen from FIG. 5G, body word class 511 is not only connected to or associated with prefix class 501, but also to a phrase starting node 500. This means that body word class 511 is also specified as a phrase starting body word class. In addition, body word class 511 is also connected to a phrase ending node 530. Therefore, body word class 511 is also specified as a phrase ending body word class.

FIG. 6A shows the process of constructing such language model structure, which will be described in more detail below.

As can be seen from FIG. 6A, the process starts at step 590. At step 591, the phrases are arranged or separated in the prefix/body/suffix structure described above in connection with FIGS. 5A through 5G and 6B. Then step 592 is performed to group the words into prefix word classes, body word classes, and suffix word classes described above in connection with FIGS. 5A through 5G. Then step 593 is performed to connect these word classes together in accordance with the linguistic rules to represent the phrases. This step produces the interconnections or associations between classes such as those shown in FIG. 5F. At step 594, the body word classes within which a word can start a phrase are then identified. At step 595, the body word classes within which a word can end a phrase are also identified. At step 596, the phrase starting node is connected to all the prefix word classes and the body word classes within which the words can start phrases. At step 597, all the suffix word classes and the body word classes within which the words can end phrases are connected to the phrase ending node. The process then ends at step 598. Again, the steps of the process shown in FIG. 6A can be implemented by any known means. This produces a single lexical tree, shown by way of example as FIG. 5G, which may be stored, in one embodiment, on mass storage device 107.

Figure 7:
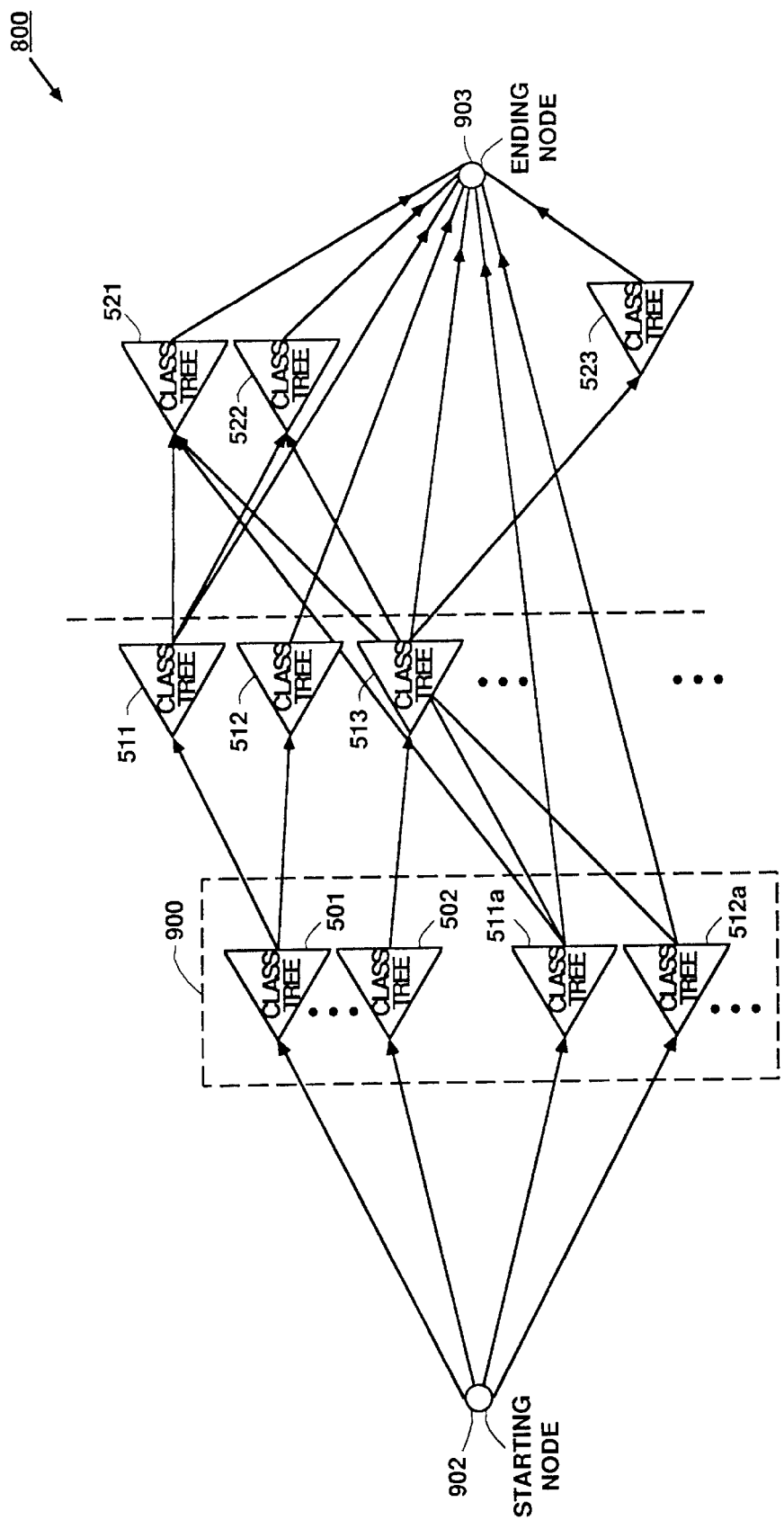
FIG. 7 shows the phrase start word class lexical tree structure created from the prefix/body/suffix language model of FIG. 3 in accordance with the processes of FIGS. 6A–6C of one embodiment of the present invention.
Figure 8:
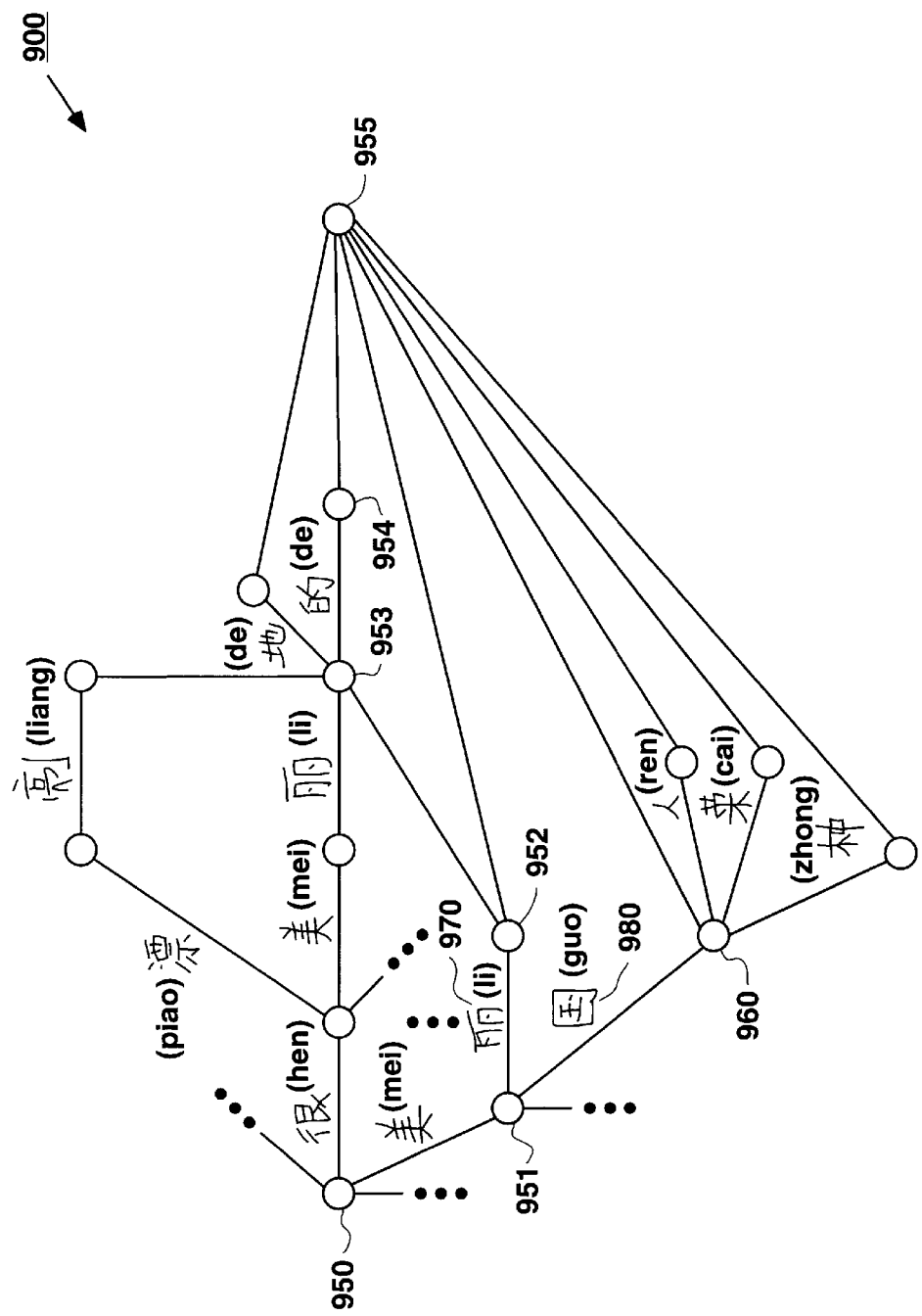
FIG. 8 schematically illustrates the organization of the phrase start word class lexical tree structure shown in FIG. 7.

Referring now to FIG. 6C, the search process of search engine 301 of FIG. 3 for guiding the acoustic matching process using the prefix/body/suffix structure of language model 303 is now described. At step 651, the words of each of the prefix, body, and suffix word classes are organized into a lexical tree (see FIGS. 5C and 5G). At step 652, each of the body word classes within which the words can start a phrase is identified. Then at step 653, the words of all the prefix word classes are organized together with the words of the body word classes having words which can start phrases. The grouped words from step 653 are then used to create a data structure referred to as a phrase start lexical tree. At this time, the connections of the body word classes that have been collapsed into the phrase start lexical tree with the prefix word classes are still maintained with respect to their suffix word classes and the ending node (see FIGS. 5G, 7, and 8). FIG. 7 essentially shows the result of step 653. As can be seen from FIGS. 5G and 7, because body word classes 511 and 512 are also connected to the starting node 500 (see FIG. 5G), duplicate body word classes 511a and 512a are created in FIG. 7 to create phrase start lexical tree 900. Although FIG. 7 shows a number of class trees in lexical tree structure 900, lexical tree structure 900 is essentially a single lexical tree structure that incorporates all the prefix words and those body words that can start phrases. FIG. 8 shows an example of collapsing the body word classes i and j with the prefix word class i to form phrase start lexical tree 900. Thus, rather than searching through both a phrase start lexical tree 900 and a lexical tree such as the tree shown in FIG. 5G, one combined lexical tree, such as that tree shown in FIG. 7 is searched through and is used to guide the acoustic model matching process.

Referring back to FIG. 6C, the process then moves to step 654, at which the phrase start node is connected to the phrase start lexical tree (i.e., tree 900). At step 655, the phrase start lexical tree (i.e., tree 900) is also connected to the phrase end node if the phrase start lexical tree includes at least one body word class having body words which can end phrases. This is also shown in FIG. 7. As can be seen from FIG. 7, since body word class 512 is directly connected to the phrase end node, phrase start lexical tree 900 is also connected to the phrase end node 903.

Referring to FIGS. 3 and 7–8, the operation of language model 303 (constructed with the single phrase start lexical tree structure 900 (FIG. 7) in accordance with one embodiment of the present invention) to guide the search of search engine 301 through the phone models of acoustic model database 302 is described below. During the speech recognition operation, search engine 301 receives a sequence of speech data vectors as a function of time from speech feature extraction process 210 (FIG. 2). Search engine 301 then compares each of the speech data vectors with an active list of phone models (i.e., phonetic Markov models) constructed from acoustic model database 302 under the guidance or governed by language model 303. For example, the initial active list of phone models constructed by search engine 301 may include all the phone models of acoustic model database 302. Search engine 301 then uses the known Viterbi procedure to determine the best score of each of the phone models in the active list compared with a first speech data vector received. Also, search engine 301 obtains a global best score among the best scores of all the phone models compared with the given speech data vector using the well known Viterbi procedure. The global best score is the best score of all the best scores for all the phone models that have been compared with the given speech vector. The global best score can be the highest or lowest score of all the phone best scores. Search engine 301 then compares the scores to construct a new active list of phone models for a next speech vector that follows the given speech vector.

Search engine 301 constructs the new active list of phone models under the guidance of language model 303 such that a best path can be found efficiently through the phone models of acoustic model database 302. For example, if the speech utterance is the phrase formed by body word 602 (FIG. 5D) and suffix word 603 (FIG. 5D), language model 303 will cause search engine 301 to construct the new active list with the phone models of the phonetic symbols "ei" when the phone model "m" scores the best. As can be seen from FIG. 8, when the search advances to node 951, language model 303 also causes search engine 301 to include the phone models of each of the Chinese characters 970 (i.e., li) and 980 (i.e., guo) in the new active list for comparison. After the character 970 (li) is recognized by the search engine 301, then the path towards node 960 can be eliminated during the acoustic matching process. In doing so, search engine 301 does not need to compare every phone model in database 302 with each of the incoming speech vectors, which causes the search to be more efficient and fast. In other words, language model 303 allows the acoustic comparison to advance with educated predictions so that the best path (e.g., the path formed by nodes 950 through 955) through the phone models can be found efficiently. Moreover, a single lexical tree structure, having both a phrase start portion and a remaining portion as described above, is searched through rather than searching several trees in parallel, although the latter may be implemented as a alternative of the present invention.

Search engine 301 uses a multi-level pruning arrangement to construct the new active list of phone models for a next speech vector of the given speech vector. Then the process continues until all of the speech vectors of the sequence of speech vectors from a speech utterance have been compared and the correct word or words have been found through the comparison. The multi-level pruning arrangement is described in more detail in a copending application of application Ser. No. 08/539,346 now U.S. Pat. No. 5706, 397, entitled A SPEECH RECOGNITION SYSTEM WITH MULTI-LEVEL PRUNING FOR ACOUSTIC MATCHING, filed on even date as the present application by Yen-Lu Chow, and assigned to the same assignee of the present application.

It will be appreciated that the foregoing process is implemented in a typical computer system having a processor and memory which are coupled together. Moreover, the processor is coupled to a transducer, such as a microphone 126 showed in FIG. 1, while the memory may be memory 104 and the processor may be processor 102 or processor 108 or the combination of processors 108 and 102. It will be appreciated that at least a portion of the language model is stored in the memory 104, it having been typically retrieved from the mass storage device 107 which is a computer-readable medium containing the data structures and computer programs necessary to implement the present invention. The memory, such as memory 104 will typically contain at least a portion of the language model which has been described above, which language model is for a plurality of phrases that are arranged in the prefix, body and suffix structure described above in accordance with the set of predetermined linguistic rules. When a speech utterance is received, the processor, such as processor 102 performs an acoustic matching process on a sequence (in time) of speech frames which are digitized representations of the speech utterance by using the language model described above. As the processor proceeds through the acoustic matching process in the manner described above, certain words will not be required to be matched as these words will be determined by the language model to be excluded from the matching process in succeeding speech frames, thereby increasing the efficiency of the speech recognition process. As described above, the language model will typically also include a phrase start lexical tree structure which maintains the interconnections of the classes such that a single tree structure forms the language model thereby further increasing the efficiency of the speech recognition process.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method implemented in a digital processing system of constructing a language model in a speech recognition system, comprising:

receiving speech signals into a processor;

storing a plurality of phrases into a plurality of words in a prefix word, body word, and suffix word structure, wherein each of the phrases has a body word and optionally a prefix word and optionally a suffix word;

grouping the words into a plurality of prefix word classes, a plurality of body word classes, and a plurality of suffix word classes in accordance with a set of predetermined linguistic rules, wherein each of the respective prefix, body, and suffix word classes includes a number of prefix words of a first category, a number of body words of a second category, and a number of suffix words of a third category, respectively;

storing data elements representing interconnections among the prefix, body, and suffix word classes together according to the predetermined linguistic rules, wherein the language model generates signals representative of the received speech signals during a phrase-based search.

2. The method of claim 1, further comprising identifying in the language model each of the body word classes a word of which can start one of the plurality of phrases;

identifying in the language model each of the body word classes a word of which can end one of the plurality of phrases.

3. The method of claim 2, further comprising connecting a phrase starting node to all of the prefix word classes;

connecting the phrase starting node to all of the body word classes a word of which can start one of the phrases.

4. The method of claim 3, further comprising connecting all of the suffix word classes to a phrase ending node;

connecting to the phrase ending node all of the body word classes a word of which can end one of the phrases.

5. The method of claim 1, wherein the predetermined linguistic rules are Chinese language rules.

6. The method of claim 1, further comprising the step of organizing the words in each of the prefix, body, and suffix word classes into a lexical tree structure and storing a representation of said lexical tree structure in a memory in said speech recognition system.

7. A method of organizing a phrase search in a speech recognition system having a language model comprising a plurality of prefix classes each having a number of prefix words of a first category, a plurality of body classes each having a number of body words of a second category, and a plurality of suffix classes each having a number of suffix words of a third category, wherein the classes are formed and interconnected together in accordance with a set of predetermined linguistic rules, wherein the method comprises the steps of:

receiving speech signals into a processor;

organizing a plurality of phrases into a prefix, body and suffix structure, wherein each of the phrases has a body word and optionally a prefix word and a suffix word;

organizing the words in each of the prefix, body, and suffix classes into a lexical tree structure;

creating a phrase start lexical tree structure for the words of all the prefix classes and the body classes having a word from which can start one of the plurality of phrases while still maintaining connections of these prefix and body classes within the language model, wherein the language model generates signals representative of the received speech signals.

8. The method of claim 7, wherein the step of creating a phrase start lexical tree structure further comprises identifying in the language model each of the body classes a word of which can start one of the plurality of phrases;

grouping the words of all of the body classes that can start one of the plurality of phrases in the language model with the words of all of the prefix classes together to form the phrase start lexical tree structure while still maintaining the interconnections of these prefix and body classes set by the predetermined linguistic rules within the language model.

9. The method of claim 8, further comprising connecting a phrase starting node to the phrase start lexical tree structure;

connecting the lexical tree structure of each of the suffix classes to a phrase ending node;

connecting ending of the body words in the phrase start lexical tree structure to the phrase ending node.

10. The method of claim 7, wherein the predetermined linguistic rules are Chinese language rules.

11. An apparatus for constructing a search engine for a phrase-based search in a speech recognition system, comprising:

means for receiving speech signals into a processor;

means for providing a language model for a plurality of phrases that are arranged in a prefix, body, and suffix structure, wherein each of the phrases has a body word and optionally a prefix word and a suffix word, wherein the language model includes a plurality of prefix classes each having a number of prefix words, a plurality of body classes each having a number of body words, and a plurality of suffix classes each having a number of suffix words, wherein the classes are formed and interconnected together according to a set of predetermined linguistic rules;

means for organizing the words in each of the prefix, body, and suffix classes into a lexical tree structure;

means for creating a phrase start lexical tree structure for the words of all the prefix classes and the body classes having a word which can start one of the phrases while maintaining interconnections of these prefix and body classes within the language model, wherein signals representative of the received speech signals are generated in response to the phrase-based search.

12. The apparatus of claim 11, wherein the means for creating further comprises means for identifying in the language model each of the body classes a word of which can start one of the plurality of phrases;

means for grouping the words of all of the body classes that can start one of the plurality of phrases in the language model with the words of all of the prefix classes together to form the phrase start lexical tree structure while still maintaining the interconnections of these prefix and body classes set by the predetermined linguistic rules within the language model.

13. The apparatus of claim 12, wherein the means for creating further comprises means for connecting a phrase starting node to the phrase start lexical tree structure;

means for connecting the lexical tree structure of each of the suffix classes to a phrase ending node;

means for connecting the phrase start lexical tree structure to the phrase ending node if the phrase start lexical tree structure includes at least one body class a word of which can end one of the phrases.

14. The apparatus of claim 11, wherein the predetermined linguistic rules are Chinese language rules.

15. A method of recognizing speech in a speech recognition system having a processor and a memory, said method comprising:

storing at least a portion of a language model in said memory, said language model for a plurality of phrases that are arranged in a prefix, body, and suffix structure in accordance with a set of predetermined linguistic rules, wherein each of the phrases has a body word and optionally a prefix word and optionally a suffix word, and wherein the language model includes a plurality of prefix classes each having a number of prefix words of a first category, a plurality of body classes each having a number of body words of a second category, and a plurality of suffix classes each having a number of suffix words of a third category, and wherein said classes are interconnected with interconnections in accordance with said set of predetermined linguistic rules;

receiving a speech utterance which includes at least one particular phrase;

performing an acoustic matching process on a representation of said speech utterance by using said language model.

16. A method as in claim 15 wherein said language model includes a data structure representing the words of all the prefix classes and the words of the body classes having words which can start said one particular phrase.

17. A method as in claim 16 wherein said data structure comprises a lexical tree structure which maintains said interconnections of said classes.

18. A method as in claim 15 wherein said step of performing an acoustic matching process comprises not matching certain words in said language model such that said acoustic matching process avoids matching said certain words, and wherein said processor performs said acoustic matching process.

19. A method as in claim 18 wherein said certain words comprise a plurality of certain suffix words.

20. A method as in claim 19 wherein said certain words further comprises a plurality of certain body words.

21. A speech recognition apparatus for recognizing speech, said apparatus comprising:

a transducer which receives a speech utterance which includes at least one phrase;

a processor coupled to said transducer to receive a digitized representation of said speech utterance;

a memory coupled to said processor, said memory storing at least a portion of a language model for a plurality of phrases that are arranged in a prefix, body, and suffix structure in accordance with a set of predetermined linguistic rules, wherein each of the phrases has a body word and optionally a prefix word and optionally a suffix word, and wherein the language model includes a plurality of prefix classes each having a number of prefix words of a first category, a plurality of body classes each having a number of body words of a second category, and a plurality of suffix classes each having a number of suffix words of a third category, and wherein said classes are interconnected with interconnections in accordance with said set of predetermined linguistic rules, and wherein said processor performs an acoustic matching process on said digitized representation of said speech utterance by using said language model.

22. An apparatus as in claim 21 wherein said language model includes a data structure representing the words of all the prefix classes and the words of the body classes having words which can start said one particular phrase.

23. An apparatus as in claim 22 wherein said data structure comprises a lexical tree structure which maintains said interconnections of said classes.

24. An apparatus as in claim 21 wherein said acoustic matching process comprises not matching certain words in said language model such that said acoustic matching process avoids matching said certain words.

25. An apparatus as in claim 24 further comprising a display coupled to said processor, said display displaying text recognized by said speech recognition system and wherein said certain words comprise a plurality of certain suffix words.

26. An apparatus as in claim 25 wherein said certain words further comprise a plurality of certain body words.

27. A computer readable medium containing executable instructions which, when executed in a processing system, causes the processing system to perform a method for recognizing speech comprising:

receiving speech signals into a processor;

processing the received speech signals using a phrase-based language model wherein;

a plurality of phrases are stored into a plurality of words in a prefix word, body word, and suffix word structure, wherein each of the phrases has a body word and optionally a prefix word and optionally a suffix word;

the plurality of words are grouped into a plurality of prefix word classes, a plurality of body word classes, and a plurality of suffix word classes in accordance with a set of predetermined linguistic rules, wherein each of the respective prefix, body, and suffix word classes includes a number of prefix words of a first category, a number of body words of a second category, and a number of suffix words of a third category, respectively;

data elements representing interconnections among the prefix, body, and suffix word classes are stored together according to the predetermined linguistic rules; and providing output signals representative of the received speech signals.

28. The computer readable medium of claim 27, wherein the method further comprises:

identifying in the language model each of the body word classes a word of which can start one of the plurality of phrases; and identifying in the language model each of the body word classes a word of which can end one of the plurality of phrases.

29. The computer readable medium of claim 28, wherein the method further comprises:

connecting a phrase starting node to all of the prefix word classes; and connecting the phrase starting node to all of the body word classes a word of which can start one of the phrases.

30. The computer readable medium of claim 29, wherein the method further comprises:

connecting all of the suffix word classes to a phrase ending node; and connecting to the phrase ending node all of the body word classes a word of which can end one of the phrases.

31. The computer readable medium of claim 27, wherein the predetermined linguistic rules are Chinese language rules.

32. The computer readable medium of claim 27, wherein the method further comprises organizing the words in each of the prefix, body, and suffix word classes into a lexical tree structure and storing a representation of said lexical tree structure in a memory in said speech recognition system.

* * * * *